United States Patent [19]
Pfeffer

[11] Patent Number: 5,985,411
[45] Date of Patent: *Nov. 16, 1999

[54] SELF-SUPPORTING PLEATED FILTER COMPOSITE

[75] Inventor: Jack R. Pfeffer, Eagle, Id.

[73] Assignee: UPF Corporation, Bakersfield, Calif.

[ * ] Notice: This patent is subject to a terminal disclaimer.

[21] Appl. No.: 08/857,316

[22] Filed: May 16, 1997

Related U.S. Application Data

[63] Continuation-in-part of application No. 08/536,974, Sep. 29, 1995, Pat. No. 5,630,856, which is a continuation-in-part of application No. 08/209,920, Mar. 14, 1994, Pat. No. 5,472,467.

[51] Int. Cl.$^6$ ............................. B32B 3/28; B32B 3/10; B32B 5/26
[52] U.S. Cl. ..................... 428/152; 428/181; 428/85; 428/95; 428/97; 442/381; 442/391
[58] Field of Search ................... 428/152, 181, 428/85, 97, 95; 442/381, 391

[56] References Cited

U.S. PATENT DOCUMENTS

| | | |
|---|---|---|
| 2,728,699 | 12/1955 | Labino . |
| 2,961,698 | 11/1960 | Rea . |
| 3,262,578 | 7/1966 | Dennis . |
| 3,690,852 | 9/1972 | Smith et al. . |
| 4,201,247 | 5/1980 | Shannon . |
| 4,463,048 | 7/1984 | Dickson et al. . |
| 4,687,697 | 8/1987 | Cambo et al. . |
| 4,877,433 | 10/1989 | Oshitari . |
| 5,169,700 | 12/1992 | Meier et al. . |
| 5,389,121 | 2/1995 | Pfeffer . |
| 5,472,467 | 12/1995 | Pfeffer . |
| 5,630,856 | 5/1997 | Pfeffer ........................................ 428/97 |

FOREIGN PATENT DOCUMENTS

WO9731695  9/1997  WIPO .

*Primary Examiner*—Terrel Morris
*Assistant Examiner*—Cheryl Juska
*Attorney, Agent, or Firm*—William W. Haefliger

[57] ABSTRACT

A filter composite comprising a first layer of glass fibers having random orientation, the layer being porous to gas flow therethrough; a porous mat of sufficient stiffness as to support the glass fiber layer during use as a filter, the mat consisting of compacted glass fibers; and an additional porous layer carried by the mat to block escape of glass fibers or particles from the filter composite during gas flow therethrough, the composite formed to have pleated or undulating configuration.

37 Claims, 5 Drawing Sheets

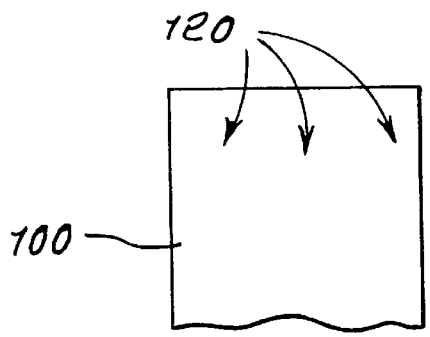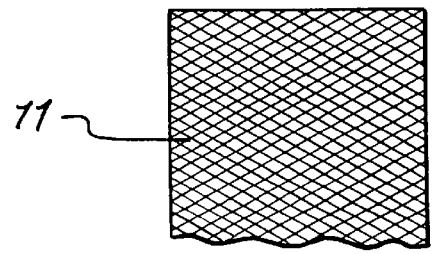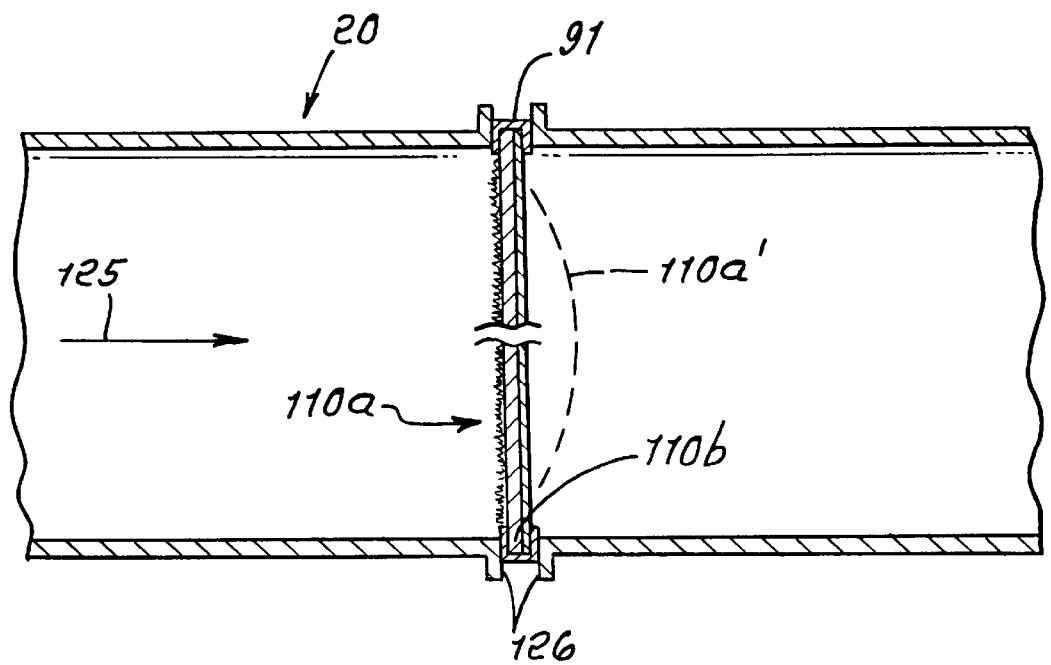

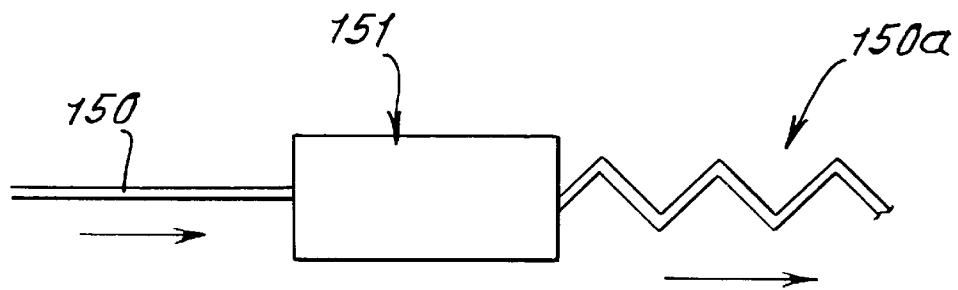
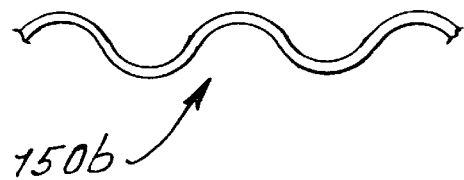
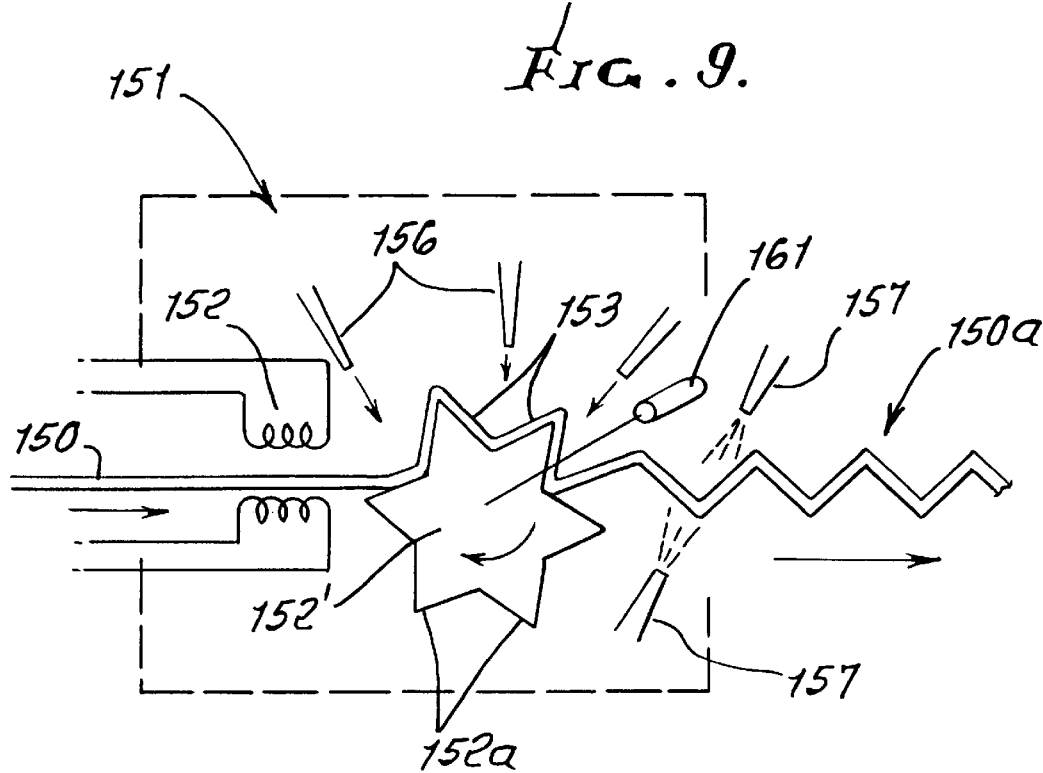

SELF-SUPPORTING PLEATED FILTER COMPOSITE

This application is a continuation-in-part of prior U.S. application Ser. No. 08/536,974, filed Sep. 29, 1995, now U.S. Pat. No. 5,630,856 which is a continuation-in-part of prior U.S. application Ser. No. 08/209,920 filed Mar. 14, 1994, now U.S. Pat. No. 5,474,467.

BACKGROUND OF THE INVENTION

This invention relates generally to forming of fiber composites, for example as are used in high-efficiency air filtration; and more particularly, the invention concerns provision of a pleated filter composite comprising multiple layers of porous material, of such characteristics as enable the composite to be self-supporting, i.e., without need for wire backing or other auxiliary support adjacent areal extents of the composite. Such wireless composites are of great advantage, as respects ease of manufacture, use in filtering, and ease of disposal. Wire-supported filters require wire trimming, producing sharp edges which can and do injure hands of workers manufacturing filters.

There is need for longer-life filters capable of efficiently filtering particulate from gas streams, and there is need for efficient, effective methods of producing such filters. There is also need for preventing escape of smaller diameter glass fibers from filter structures. The disclosure of U.S. Pat. No. 3,690,852, incorporated herein by reference, concerns production of a filter comprising two layers of fibers of different sizes. The present invention improves upon the methods described in that patent, as will be seen.

The present invention also improves upon apparatus disclosed in that patent in that it provides for a self-supporting, multi-layer pleated composite requiring no wire backing, as referred to above.

There is also need for improved filters capable of removing up to 95% of particulate of 1 micron size, and characterized by very low back pressure presentation to gas flow.

SUMMARY OF THE INVENTION

It is a major object of the invention to provide an improved filter composite meeting the above needs. That composite basically comprises:

a) a first layer of glass fibers having random orientation, the layer being porous to gas flow therethrough, the first layer fibers having diameters between about 0.000035 and 0.00015 inch, b) and a porous, non-woven, glass mat of sufficient stiffness as to support the glass fiber layer during use as a filter, the mat consisting of compacted glass fibers, c) the filter composite having pleated configuration.

An additional porous layer may be carried by the mat to block escape of glass fibers or particles from the filter composite during gas flow therethrough. The first and additional layers may be adhered to opposite sides of the mat.

As will be seen, the filter may be supported in a gas flow duct with the first layer of glass fibers presented toward the oncoming flow, the filter composite in that environment being free of wire support adjacent the area of the composite within the duct. In addition, the first layer of glass fibers may be randomly tufted to provide extended surface area for collection of particulate in the gas flow; further the first layer typically has fiber density characterized in that at least about 95% of all particulate of one micron size in said flow is collected.

Another object of the invention is to provide the porous mat with sufficient thickness in relation to its overall area as to enable the pleats to be resiliently and yieldably bendable during gas flow impingement on the composite. Such bending of the mat results in bending of the first layer of glass fibers, reducing surface build-up of particulate on the first layer. Typically, the mate has thickness substantially less than the overall thickness of the first layer of glass fibers. In this regard, the mat typically consists essentially of non-woven glass fibers, which are compacted and which adhere to one another.

A further object is to provide the additional porous layer, which blocks escape of glass fibers, to consist essentially of non-woven, synthetic fiber, one example being CEREX, an air laid, NYLON, non-woven layer. That additional layer is substantially thinner than the mat and is typically bonded to the mat during the mat manufacturing process.

Another object is to provide a method of forming the fibrous filter composite, the steps of the method including:

a) forming a first layer of glass fibers having random orientation, the layer being porous to gas flow therethrough, the first layer fibers having diameters between about 0.000042 and 0.000046 inch, b) forming a porous mat and supporting said first layer of fibers tat one side of the mat, the mat being of sufficient stiffness as to support the glass fiber layer during use as a filter, the mat comprising compacted glass fibers, c) and processing the composite to have pleated configuration.

As will be seen, the fiber diameter range 0.000035 to 0.00015 inch corresponds to removal of between 95% and 45% of particulate of 1 micron size (i.e. between 95% and 45% efficiency).

In this regard, another objective and advantage of the invention lies in the fact that the composite construction of the filter media allows use of a more coarse fiber at the upper surface of the media, for any given particle removal efficiency. Thus, for any given efficiency, thirty to forty percent more air is allowed to pass through the media at any given pressure. Resultant advantages include:

1) lower filter construction costs
2) longer filter life
3) less energy required for air systems.

The method also contemplates providing a porous means to be carried by the mat to block escape of glass fibers or particles from the filter composite during gas flow therethrough, and attaching the porous means to the mat at a location or locations at the opposite side of the mat. Such attaching may advantageously include employing thermoplastic binder resin; and such processing of the components may include heating of the composite and resin to soften the binder resin during forming of the pleated configuration.

These and other objects and advantages of the invention, as well as the details of an illustrative embodiment, will be more fully understood from the following specification and drawings, in which:

DRAWING DESCRIPTION

FIG. 3 is a plan view of the additional porous layer bonded to the underside of the mat and showing bond locations;

FIG. 4 is a plan view of the mat layer;

FIG. 5 shows the composite filter as it may be installed in a gas flow duct for collecting particulate in the gas flow;

FIG. 8 is a diagram illustrating processing of the composite to have pleated configuration; and FIG. 9 is a diagram showing use of a tool with projections to form pleats in the composite.

DETAILED DESCRIPTION

Figure 1:
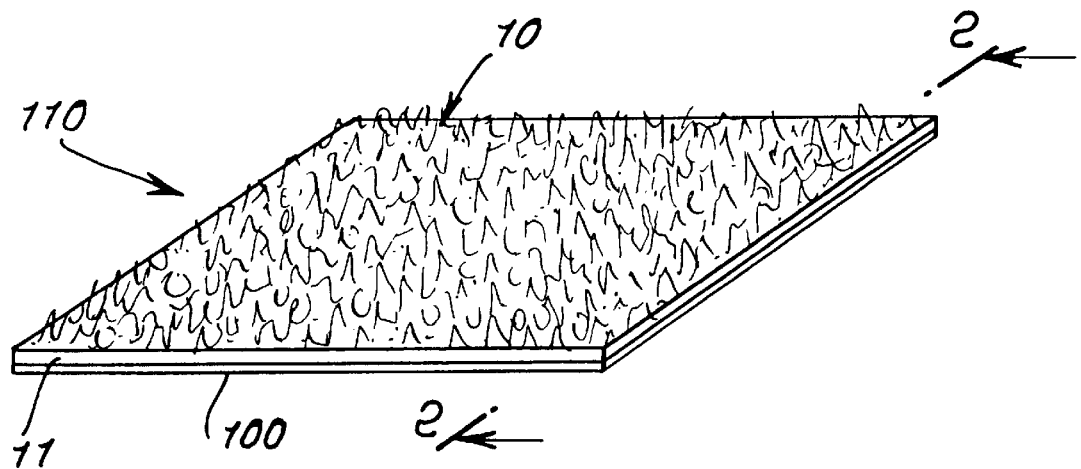
FIG. 1 is a perspective view of a composite filter embodying the invention.
Figure 2:
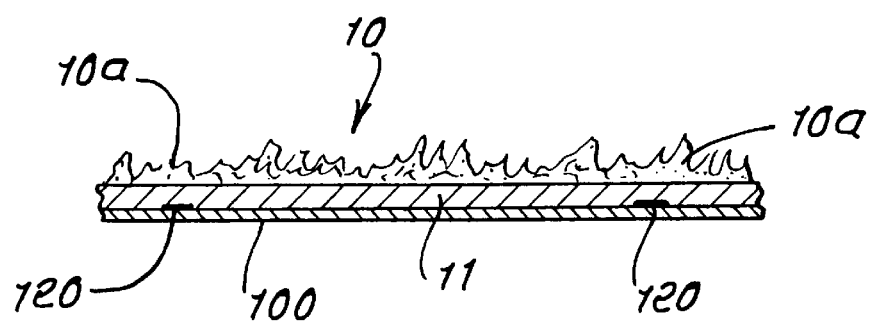
FIG. 2 is a section taken on lines 2—2 of FIG. 1.
Figure 6:
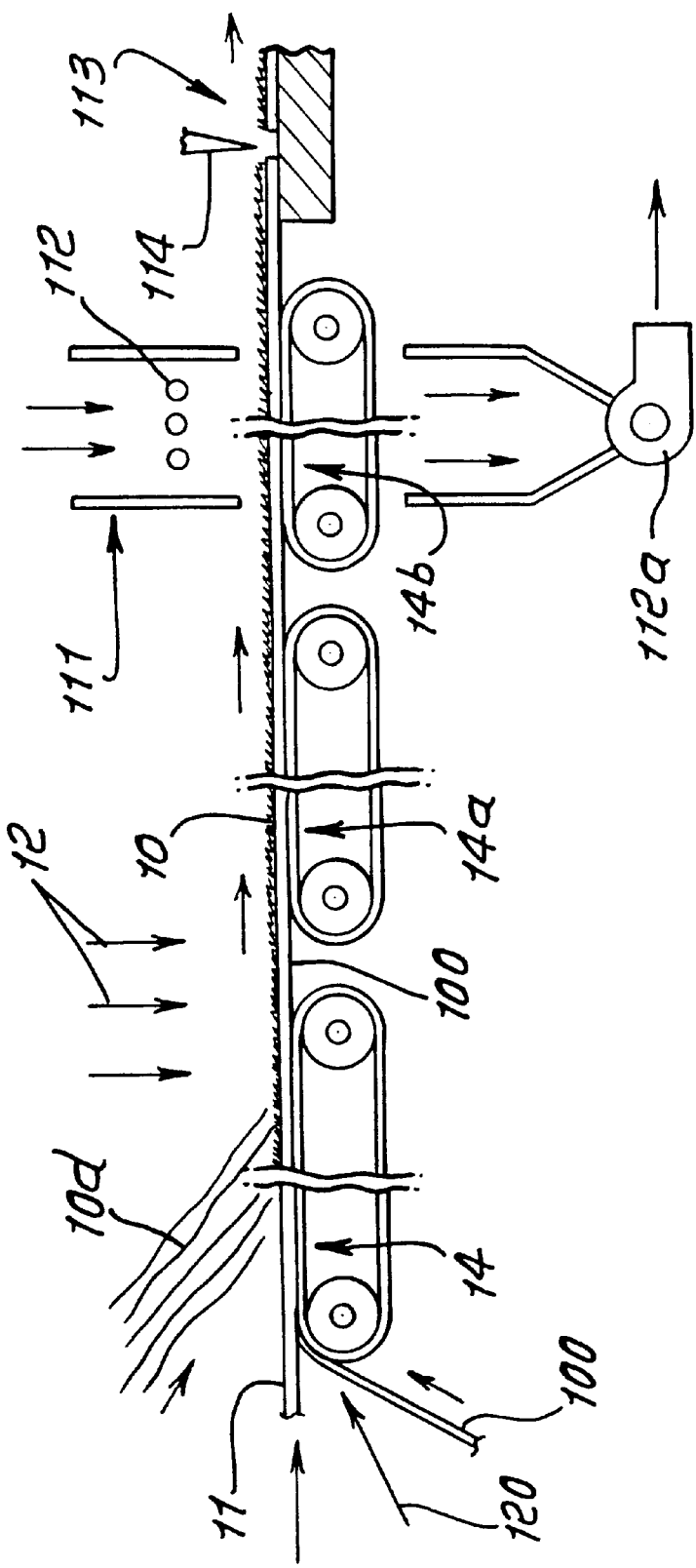
FIG. 6 is an elevation showing the method of forming the composite filter.
Figure 7:
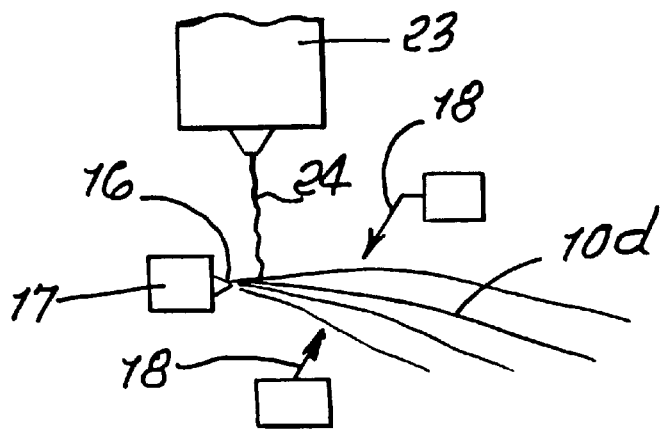
FIG. 7 is a view showing the formation of glass fibers; the disbursing of such fibers onto a mat in a first layer; and the attachment of the additional porous means to the underside of the mat.

Referring first to FIGS. 6 and 7, the method of forming the fibrous composite includes forming a first layer 10 of glass fibers (of random orientation) onto a non-woven glass fiber mat 11, in side-by-side relation, as in FIGS. 1 and 2; and passing gas, such as air, through 10 and 11 to effect good adherence of layer 10 to mat 11; and controlled reduction in overall thickness of the first layer, as for example to the resultant condition seen in FIGS. 1 and 2.

Arrows 12 indicate controlled flow of gas, such as air, through fibers, to reduce layer 11 to the indicated reduced thickness form as shown. Mat 11 was typically preformed to the compressed condition and thickness, as shown, the fibers therein bonded together by application of adhesive, such as synthetic resin to the fibers as they are formed, and laid down, and then compressed into relatively stiff sheet form, the resin then curing. The mat sheet is resiliently and yieldably bendable. The binder resin advantageously consists of a water resistant thermoplastic resin, which allows the formed mat to be re-formed in the presence of heat.

In addition, a thin, flexible layer 100 of porous material (as for example CEREX), is attached, as by porous adhesive bonding, to the underside of the mat 11 for containing (preventing escape of) very small diameter glass fibers in 10, which can tend to break. Layer 100 has a surface weight of between about 0.4 and 0.5 oz. per square yard, its thickness being between 0.001 and 0.005 inch. Conveyor 14 supports layer 100. CEREX is an air laid, NYLON, non-woven material made by Fiber Web.

First layer 10 typically has at least about 95% particulate retention capacity. In this regard, the sizing of the filter voids in layer 10 can be "tailored" to the particulate stream to be filtered, as by controlled compression of that layer 10 by the air or gas stream 12. The latter also aids in curing the bonding material applied to all the glass fibers dispersed to form layer 10. Application of gas stream 12 can be continued until layer 10 attains desired overall thickness, due to controlled curing of the bonding material, i.e., synthetic thermoplastic resin holding the layer in somewhat compressed condition.

Tufts of fiber are desirably formed, as at 10a, seen in FIG. 2, to increase overall surface exposure of layer 10 to oncoming air flow to be filtered. See for example flow 125 in duct 120. The composite filter 110 is held in position by cardboard frame 91 receiving the filter edges 110b, the frame being held in position by cardboard frame 91 receiving the filtered edges 110b, the frame being held in position by the duct shoulders 126. Tufts 10a are presented upstream to the flow, and are randomly oriented and distributed, as seen.

It has been found that if the fibers in the first layer have diameters between 0.000042 and 0.000046 inch, 95% of particulate of one micron size is collected, the filter then presenting very low back pressure i.e. resistance to on-coming air or gas flow, in a duct. The achieved low pressure drop is about 0.50 to 0.55 percent, whereas prior pressure drops were no lower than about 0.75 to 0.77 percent, as in composites disclosed in U.S. Pat. No. 5,474,467. As referred to above, however, the invention also contemplates use of fiber diameters between 0.000035 and 0.00015 inch corresponding to a range of about 95% to 45% efficiency. Referring to FIG. 7, a stream or streams 24 of molten glass are drawn downwardly from an orifice or orifices in a glass melt tank 23. Hot gas jets 16 produced by burners 17 melt the fiber or fibers to attenuate them into finer fibers displaced or flown rightwardly as shown at 10d. Those fibers travel rightwardly to deposit onto the mat 11. Binder is also dispersed at 18 onto or into the blown fibers to cause them to adhere to the mat and to one another, upon curing, in layer 10, described above.

FIG. 6 also shows passage of the formed composite 110 onto a second conveyor 14a for transfer to a third conveyor 14b. The composite 110 is cured and dried as it is conveyed by a porous belt 14b through an oven 111, wherein heater elements 112 heat air that passes downwardly through the porous composite to dry and cure same. A fan to produce air flow is indicated at 112a. The composite emerging from the oven in then transported to a cutting zone 113 wherein a cutter or cutters 114 cuts sections of the composite to desired length, the edges also being suitably trimmed by cutters.

Figure 6A:
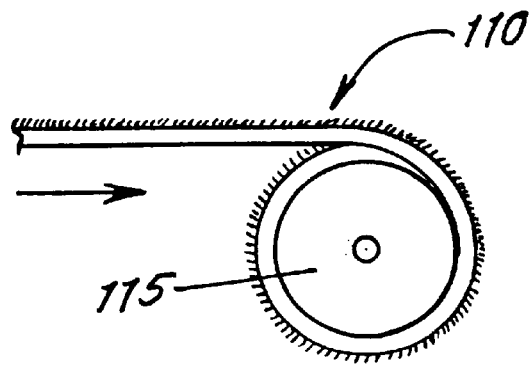
FIG. 6a is a schematic showing of roll-up of the finished filter on a drum or roller.

FIG. 6a shows roll-up of the composite 110 onto a drum or roller 115 for storage.

FIGS. 1 and 2 show the composite in greater detail with the first layer 10 of glass fibers adhered to the upper side of the mat 11. The porous additional layer 100 is shown adhered to the underside of the mat. Arrows 120 indicate distribution of binder onto the layer 100. See also FIGS. 3 and 6.

The first layer 10 consists of glass fibers having random orientation, that layer being porous to gas flow therethrough. Tufts 11a project upwardly and provide greatly increased particle collection area during filter use.

As referred to, the porous mat 11 consists of non-woven glass fibers, which are previously compacted in the dense, flat layer form as shown, to have substantially less thickness than the first layer 10. The thickness of the mat is typically between 0.05 and 0.07 inches for best results, i.e., to provide wirefree support for the glass fiber layer 10, and to be yieldably and resiliently bendable, yet sufficiently stiff to be self-supporting and to support the layers 10 and 100. The binder-coated fibers of layer 10 adhere to the top surface of the mat during curing of the composite, whereby layer 10 is attached to the mat, yet porosity of the completed filter product is maintained.

As referred to, the additional layer 100 may be substantially thinner than the mat. The function of layer 100 is to collect glass fibers or particles, which may detach from layer 10 in use, so as to prevent their flow downstream. The adhesive or binder may consist of polyvinyl or other glue-type adhesive.

The composite filter is formed to have weight between 0.03 and 0.04 lbs. per square foot. Also, layer 10 is formed to have volumetric density of between 0.25 and 0.45 lbs. per cubic foot. The bulk of the weight of the composite is comprised of mat weight.

In FIG. 5, the resultant composite filter 110a, typically rectangular in outline, is located in a duct 120. Edge portions of the composite are received in a rectangular cardboard frame 91, channel-shaped in cross section, as shown. The frame is retained between duct shoulders 126. The filter is resiliently and yieldably bendable, as to broken line position seen at 110a', in response to air or gas pressure exertion on its face. Changes in air pressure allow the filter to flex back and forth.

The nominal overall thickness of the composite filter is between 0.25 and 0.40 inches.

Referring to FIG. 8, it shows processing of the formed composite 150 which may be as shown in FIGS. 1 and 2 at 150 (other composites coming within the scope of the claims being usable). The composite is advanced rightwardly into a processing zone 151, from which the composite emerges at 150a in pleated condition. A possible undulating condition is shown at 150b.

FIG. 9 shows use of one possible processing equipment at zone 151. That equipment includes a rotary tool 152' having circularly spaced tapering projections 152a. that come into engagement with the composite 150 advanced into zone 151 as the tool is controllably rotated by drive 161. Electrical heaters 152 heat the fed composite to soften the thermoplastic binder as referred to. Also, the tool may be heated, to maintain softness of the binder as the pleats 153 are formed in the composite and on the tool 152 as the tool rotates. Warm or hot air jets 156 blow or deflect the arriving composite against the projections 152a, to form the pleats. The pleated configuration is shown leaving the processing zone with cool air jets 157 acting to cool the thermoplastic to hold or maintain the desired pleated form of the resultant filter.

The pleated composite has weight between 0.03 and 0.04 lbs. per square foot, when the pleats are flattened to extend in a common plane.

I claim:

1. A filter composite, comprising
a) a first layer of glass fibers having random orientation, said layer being porous to gas flow therethrough, and
b) a porous mat of sufficient stiffness to support said glass fiber layer during use as a filter, said mat consisting of compacted fibers, said first layer adherent to the mat,
c) said filter composite having sufficient thickness to enable processing to pleated configuration.

2. The filter composite of claim 1 including: d) an additional porous layer carried by the mat to block escape of glass fibers or particles from the filter composite during gas flow therethrough, said first layer and said additional layer being adhered to the mat at opposite sides thereof.

3. The filter composite of claim 2 including means supporting said filter composite in a gas flow duct with said first layer of glass fibers presented toward the gas flow.

4. The filter composite of claim 3 wherein said filter composite is free of wire support adjacent the filter composite within the duct.

5. The filter composite of claim 1 wherein said first layer of glass fibers has randomly distributed tufts projecting away from said mat to provide extended surface area for collection of particulate.

6. The filter composite of claim 4 wherein said first layer of glass fibers has randomly distributed tufts projecting away from said mat to provide extended surface area for collection of particulate.

7. The filter composite of claim 1 wherein the first layer and mat of said filter composite have overall thickness of between 0.25 and 0.40 inch.

8. The filter composite of claim 1 having weight between 0.03 and 0.04 lbs. per square foot, when the pleats are flattened to extend in a common plane.

9. The filter composite of claim 2 wherein said additional porous layer consists essentially of non-woven, synthetic fiber.

10. The filter composite of claim 9 wherein said synthetic fiber consists of non-woven NYLON.

11. The filter composite of claim 1 wherein said mat consists essentially of non-woven, glass fibers.

12. The filter composite of claim 2 including resin bonding said additional layer to said mat.

13. The filter composite of claim 2 including resin bonding said additional layer and said first layer to opposite sides of the mat.

14. The filter composite of claim 3 in which the first layer has fiber density wherein the composite is capable of removing between 45% and 95% of all one micron or larger sized particulate from a flow, said first layer fibers having diameters between about 0.000035 and 0.00015 inch.

15. A filter composite comprising:
a) porous mat of sufficient stiffness as to support said composite during use as a filter, said mat consisting of compacted glass fibers, and
b) an additional porous layer carried by and adhered to the mat to block escape of glass fibers or particles from the filter composite during gas flow therethrough,
c) said filter composite having pleated configuration.

16. The filter composite of claim 15 wherein said additional layer consists of non-woven NYLON bonded to said mat.

17. The method of forming a fibrous filter composite, that includes the steps
a) forming a porous mat,
b) forming a first layer of glass fibers having random orientation, said layer being porous to gas flow therethrough,
c) adhering said first layer of fibers to one side of the mat, the mat being of sufficient stiffness to support the glass fiber layer during use as a filter, the mat comprising compacted fibers,
d) and processing said first layer and the mat to have pleated configuration.

18. The method of claim 17 including:
e) providing a second porous layer to be carried by the mat to block escape of glass fibers or particles from the filter composite during gas flow therethrough,
f) and attaching said second porous layer to the mat said attaching including employing thermoplastic binder resin, and heating the first layer, mat, second layer and resin in the composite to soften the resin during forming of said pleated configuration.

19. The method of claim 17 including forming said first layer of glass fibers to be randomly tufted to provide extended surface area, for collection of particulate.

20. The method of claim 17 including forming said composite to have overall thickness between 0.25 and 0.40 inch.

21. The method of claim 17 wherein said composite is formed to have weight less than 0.04 lbs. per square foot, when the pleated configuration is flattened to extend in a common plane.

22. The method of claim 17 including providing and employing resin to effect said adhering, and said processing includes heating said first layer, said mat and said resin to soften the resin.

23. The method of claim 17 wherein the first layer has sufficient density that the composite is capable of removing about 45% to 95% of all one micron or larger sized particulate from a flow.

24. The method of claim 17 wherein said first layer is formed by steps that include withdrawing glass strands from a glass melt, blowing gas onto said strands to attenuate the strands into fibers and to displace the fibers to deposit them on the mat, and dispersing binder into the displaced fibers, and bind fibers to the mat, said binder consisting of thermoplastic resin.

25. The method of claim 24 including providing an oven, and passing the composite through said oven for curing the composite, and then cutting the cured composite to filter size.

26. The method of claim 17 wherein said processing includes providing a pleat forming tool having projections, and contacting said tool projections with the composite to deform the composite into pleated configuration.

27. The method of claim 26 wherein said composite includes thermoplastic binder resin, and said composite and resin are at elevated temperature during said contacting of the tool projections with the composite.

28. The method of forming a filter media that includes:
   a) forming a porous mat consisting of non-woven glass fibers, and forming a tufted layer of glass fibers on the mat,
   b) and attaching said layer to a side of the mat, to form a composite,
   c) the overall thickness of the filter being less than about 0.40 inch,
   d) and the composite having sufficient stiffness to enable processing said composite to have undulating configuration and to support said layer during filtering use.

29. The method of claim 28 including forming said tufted layer of glass fibers attached to the mat at a side thereof by resinous bonding.

30. The method of claim 28 wherein fibers in said tufted layer have diameters between about 0.000035 and 0.00015 inch.

31. A filter composite, comprising
   a) a porous mat of sufficient stiffness to define and support a filter in pleated configuration of said mat,
   b) and thermoplastic resin acting as a bond at said mat.

32. The filter composite of claim 31 including a non-woven, porous synthetic fiber layer adhered to the mat.

33. The composite of claim 31 wherein said mat is in deformed condition to define pleated configuration.

34. The composite of claim 31 wherein the mat has thickness greater than 0.01 inches.

35. The composite of claim 31 including a porous layer of glass fibers adherent to the mat.

36. The composite of claim 32 including a porous layer of glass fibers adherent to the mat.

37. A filter composite, comprising
   a) a porous mat,
   b) a first layer of glass fibers having random orientation, said layer being porous to gas flow therethrough, and
   c) said porous mat being of sufficient stiffness as to support said glass fiber layer during use as a filter, said mat consisting of compacted fibers,
   d) said filter composite having pleated configuration.

* * * * *